(12) United States Patent
Nishiki et al.

(10) Patent No.: US 6,456,762 B1
(45) Date of Patent: Sep. 24, 2002

(54) METHOD OF FABRICATING OPTICAL WAVEGUIDE DEVICE

(75) Inventors: Akihiko Nishiki, Tokyo (JP); Shigeki Ogura, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 58 days.

(21) Appl. No.: 09/699,631

(22) Filed: Oct. 31, 2000

(30) Foreign Application Priority Data

Dec. 9, 1999 (JP) .......................................... 11-350326

(51) Int. Cl.$^7$ ................................................ G02B 6/34
(52) U.S. Cl. ....................................................... 385/37
(58) Field of Search ................................... 385/37, 123

(56) References Cited

U.S. PATENT DOCUMENTS

| 4,474,427 A | 10/1984 | Hill et al. ................... 385/123 |
| 4,807,950 A | 2/1989 | Glenn et al. ................. 385/123 |
| 5,104,209 A | 4/1992 | Hill et al. ...................... 385/27 |
| 5,367,588 A | 11/1994 | Hill et al. ...................... 385/37 |
| 5,719,974 A | * 2/1998 | Kashyap ....................... 385/37 |
| 5,830,622 A | * 11/1998 | Canning et al. ............. 372/102 |

* cited by examiner

*Primary Examiner*—Tulsidas Patel
(74) *Attorney, Agent, or Firm*—Venable; Michael A. Sartori

(57) ABSTRACT

A method of fabricating an optical waveguide device has the steps of forming a Bragg grating by applying ultraviolet light to an optical waveguide to generate photoinduced refractive index changes, and adjusting characteristics of the Bragg grating by applying ultraviolet light for trimming to the optical waveguide. The Bragg grating forming step is executed by applying ultraviolet light to the optical waveguide through a phase mask, and the adjusting step is executed by applying ultraviolet light for trimming to the optical waveguide not through the phase mask.

18 Claims, 10 Drawing Sheets

METHOD OF FABRICATING OPTICAL WAVEGUIDE DEVICE

BACKGROUND OF THE INVENTION

The present invention relates to a method of fabricating an optical waveguide device such as an optical filter, and particularly to a method of adjusting the characteristics of a Bragg grating formed in an optical waveguide such as an optical fiber.

In U.S. Pat. No. 5,367,588 published on Nov. 22, 1994, a method of fabricating a Bragg grating using a phase mask is disclosed. According to the method disclosed in the document, a phase mask is placed on an optical fiber having a photorefractive effect characteristic (photoinduced refractive index change caused by ultraviolet (UV) light radiation), and UV light is applied through the phase mask to the optical fiber. The UV light incident on the phase mask are diffracted by the phase mask and interfere with one another, causing interference at a pitch of Λ, which is a half of the phase mask pitch 2Λ. Accordingly, at the core of the optical fiber, the photorefractive effect causes the refractive index to change at a pitch of Λ, forming the Bragg grating in the core of the optical fiber as a result. The Bragg grating reflects input light having a Bragg wavelength $\lambda_B$, expressed as $\lambda_B = 2n_{eff}\Lambda$, where $n_{eff}$ is an effective refractive index in the Bragg grating area.

A demultiplexing or multiplexing optical wavelength filter utilizing Bragg grating is required to have a reflectance of the order of 100%. On the other hand, when a Bragg grating is applied in a gain-flattening filter of an optical amplifier, for instance, a filter having reverse reflection spectrum characteristics to the gain characteristics of the optical amplifier is required. If an optical filter utilizing a Bragg grating is used to choose a wavelength of a semiconductor laser or to stabilize the wavelength, such a reflectance that would minimize the loss of output efficiency of the semiconductor laser must be set.

The dependence of photoinduced refractive index change Δn on UV light intensity (that is, the total energy E (J cm$^2$) of UV light applied to a unit area) has logarithmic characteristics, as shown in FIG. 13. FIG. 13 shows that the photoinduced refractive index change Δn is prominent (the inclination of the curve in FIG. 13 is steep) when the total energy E of UV light is small and is less prominent (the inclination of the curve in FIG. 13 is gentle) when the total energy E of UV light is large. Conventionally, an area in which the total energy E of UV light is small has been used to form a Bragg grating with low reflectance. Because small fluctuations in fabricating conditions (that is, variance of the total energy E of UV light) have a great effect on the photoinduced refractive index change Δn (and consequently to the reflectance), it has been difficult to provide an adequately high reflectance precision (fabricating reproducibility) in comparison with that provided in forming a Bragg grating with high reflectance (high total energy E of UV light).

SUMMARY OF THE INVENTION

It is an object of the present invention to provide a method of fabricating an optical waveguide device by which reflection characteristics of a Bragg grating can be precisely adjusted.

According to the present invention, a method of fabricating an optical waveguide device comprises the steps of forming a Bragg grating by applying UV light to an optical waveguide to generate photoinduced refractive index changes; and adjusting characteristics of the Bragg grating by applying UV light for trimming to the optical waveguide. The Bragg grating forming step is executed by applying UV light to the optical waveguide through a phase mask, and the adjusting step is executed by applying UV light for trimming to the optical waveguide not through the phase mask.

Since this method includes the adjusting step that is executed by applying UV light for trimming to the optical waveguide not through the phase mask, reflection characteristics of a Bragg grating can be precisely adjusted.

If the distribution of the total energy of UV light applied to a unit area in the adjusting step is even over the entire longitudinal range of the area in which Bragg grating is formed, the reflectance and the center wavelength of the reflection light of the optical waveguide device to be manufactured can be adjusted.

If the distribution of the total energy of UV light applied to a unit area in the adjusting step is a trapezoidal profile gradually descending in the vicinity of both longitudinal edges of the area in which Bragg grating is formed, the Fabry-Perot interference in the manufactured optical waveguide device is suppressed and the side lobe suppression ratio of the Bragg grating can be improved.

If the adjusting step is executed for a part of the area in which Bragg grating is formed, the manufactured optical waveguide device can be provided with such a property that the reflectance abruptly changes at a desired wavelength.

If the distribution of the total energy of UV light applied to a unit area in the adjusting step gradually increases or decreases along the longitudinal direction of the area in which Bragg grating is formed, the manufactured optical waveguide device can be provided with such a property that the reflectance increases or decreases with increase in wavelength.

If the distribution of the total energy of UV light applied to a unit area in the adjusting step continuously varies along the longitudinal direction of the area in which Bragg grating is formed, the manufactured optical waveguide device can be provided with a desired reflection property (or a transmittance property), particularly a useful property for use as a gain-flattening device.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1A shows a Bragg grating forming step, and FIG. 1B shows an adjusting step (or a trimming step);

FIG. 2A shows a refractive index distribution and an effective refractive index of the core after the Bragg grating forming step, FIG. 2B shows a refractive index distribution and an effective refractive index of the core after the trimming step, and FIG. 2C shows a relationship between the total energy of UV light applied to the unit area and photoinduced refractive index change;

FIG. 8A shows a refractive index distribution and an effective refractive index of the core after the Bragg grating forming step, and FIG. 8B shows a refractive index distribution and an effective refractive index of the core after the trimming step;

FIG. 9A shows a refractive index distribution and an effective refractive index of the core after the Bragg grating forming step, FIG. 9B shows the refractive index distribution and an effective refractive index of the core after the trimming step, and FIG. 9C shows how the reflection spectrum varies while the trimming step is repeated;

FIG. 10A shows a refractive index distribution and an effective refractive index of the core after the Bragg grating forming step, FIG. 10B shows a refractive index distribution and an effective refractive index of the core after the trimming step, and FIG. 10C shows a variation in reflection spectrum due to the trimming step;

FIG. 12A shows a refractive index distribution and an effective refractive index of the core after the Bragg grating forming step, FIG. 12B shows a refractive index distribution and an effective refractive index of the core after the trimming step, and FIG. 12C shows a variation in reflection spectrum due to the trimming step;

FIGS. 12A to 12C relate to a sixth embodiment of the present invention, FIG. 12A shows a refractive index distribution and an effective refractive index of the core after the Bragg grating forming step, FIG. 12B shows a refractive index distribution and an effective refractive index of the core after the trimming step, and FIG. 12C shows a variation in transmittance due to the trimming step.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

This embodiment relates to an adjustment of a reflectance and a center wavelength of reflection of a uniform Bragg grating.

Figure 1A:
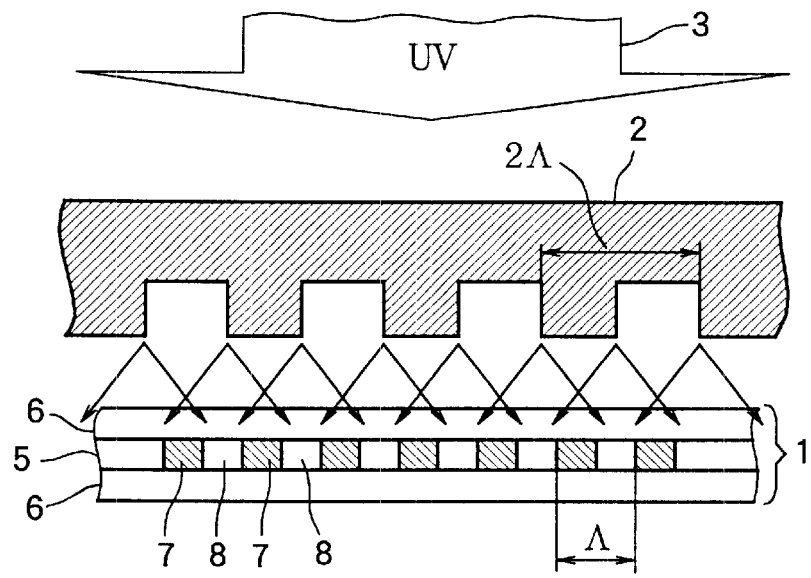
FIGS. 1A and 1B relate to a method of fabricating an optical waveguide device according to a first embodiment of the present invention.
Figure 1B:
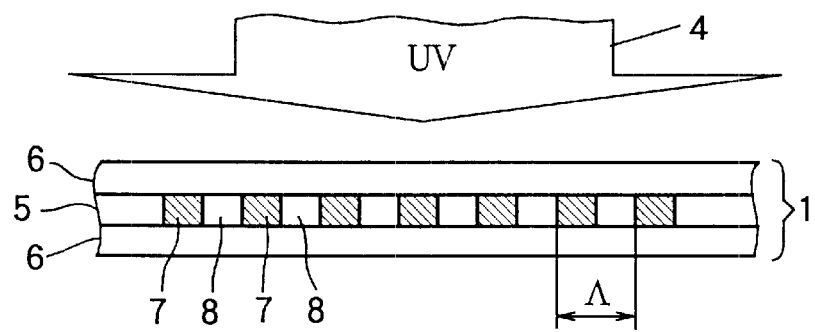

FIGS. 1A and 1B illustrate a method of fabricating an optical waveguide device of the first embodiment of the present invention, FIG. 1A shows a Bragg grating forming step, and FIG. 1B shows a trimming step for adjusting the characteristics of the Bragg grating.

As shown in FIG. 1, the fabricating method of the first embodiment comprises a Bragg grating forming step (FIG. 1A), in which the UV laser light (or UV light) 3 is applied through a phase mask 2 to an optical fiber 1 as an optical waveguide to generate photoinduced refractive index changes, and a trimming step (FIG. 1B), in which the UV laser light 4 is applied to the optical fiber 1 not through the phase mask 2. The Bragg grating may also be formed by a method other than the phase mask method (two-beam interference method, for instance).

Used as the optical fiber 1 is a photosensitive optical fiber comprising a core 5 formed by a Germanium-doped quartz waveguide and a clad 6 enclosing the outside of the core 5 (product number "PS1500" manufactured by FiberCore Inc., for instance). In the first embodiment, the line-and-space pitch of the phase mask 2 is fixed to 2Λ. UV coherent light with a wavelength of about 240 nm emitted from an argon second harmonic generation (SHG) laser is used as the UV laser light 3, for instance. If the UV laser light 3 is applied to the optical fiber 1 through the phase mask 2, as shown in FIG. 1A, portions 7 in which the refractive index changes and portions 8 in which the refractive index does not change are alternately formed in the core 5 in a direction of a core axis (that is, a longitudinal direction of the optical fiber or a longitudinal direction of an area in which the Bragg grating is formed), at a pitch of Λ, which is a half of the pitch 2Λ of the phase mask 2. Consequently, an area in which the refractive index is periodically distributed (that is, Bragg grating area) is formed in the core 5.

In the next trimming step, as shown in FIG. 1B, the UV laser light 4 is applied to the optical fiber 1 not through the phase mask 2. The UV laser light 4 may be the same as the UV laser light 3. When the UV laser light 4 is applied, the table (not shown) supporting the optical fiber 3 or the UV laser light 4 is moved in the direction of the core axis at a constant speed, for instance. The trimming step may be executed just once or may be executed multiple times to bring the characteristics of the optical fiber to required values. In FIG. 1, the trimming step is executed after the Bragg grating forming step, but the trimming step may also be. executed prior to the Bragg grating forming step.

Figure 2A:
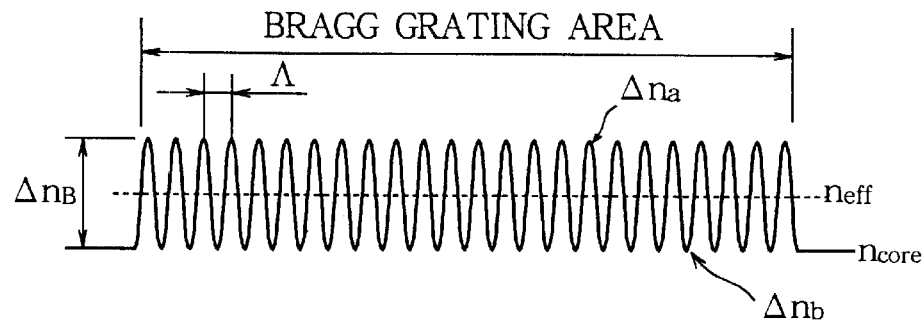
FIGS. 2A to 2C relate to the first embodiment.
Figure 2B:
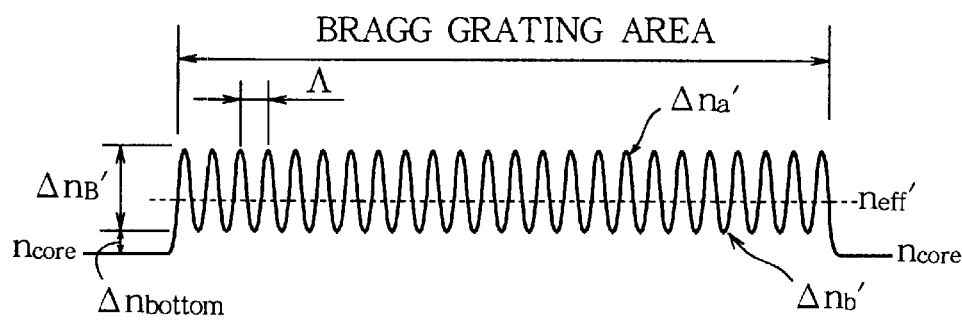
Figure 2C:
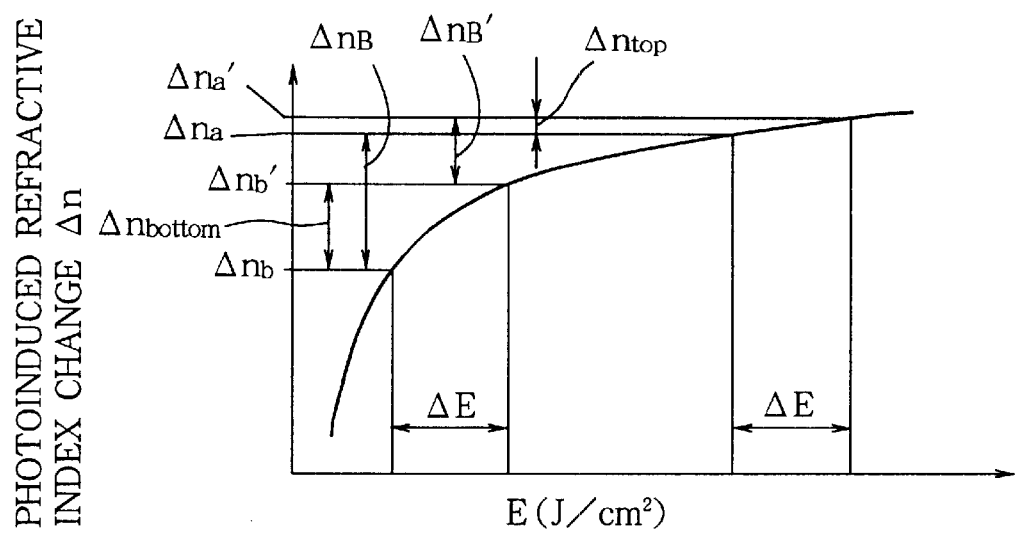

FIGS. 2A to 2C illustrate the method of fabricating the optical waveguide device of the first embodiment. FIG. 2A shows a refractive index distribution (solid line) and an effective refractive index $n_{eff}$ (broken line) of the core 5 after the Bragg grating forming step. FIG. 2B shows a refractive index distribution (solid line) and an effective refractive index $n_{eff}'$ (broken line) of the core 5 after the trimming step. FIG. 2C illustrates that the photoinduced refractive index change Δn to UV light energy ΔE (J/cm²) per unit area varies with the total energy E (J/cm²) of UV light radiation.

As represented by the solid line in FIG. 2A, the refractive index distribution of the core 5 after the Bragg grating forming step has a photoinduced refractive index difference of $\Delta n_B$ and a refractive index change cycle (pitch) of Λ, and the maximum value of the crests (portions corresponding to the portion 7, in which the refractive index changes, in FIG. 1) is $\Delta n_a$ while the minimum value of the troughs (portions corresponding to the portion 8, in which the refractive index does not change, in FIG. 1) is $\Delta n_b$. A symbol $n_{core}$ denotes the refractive index of the core 5 before UV light radiation. In this case, the Bragg wavelength $\lambda_B$ is expressed as $\lambda_B = 2 n_{eff} \Lambda$.

As represented by the solid line in FIG. 2B, the refractive index distribution of the core 5 after the trimming step has a photoinduced refractive index difference of $\Delta n_B'$ and a cycle of Λ, and the maximum value of crests is $\Delta n_a'$ while the minimum value of troughs is $\Delta n_b'$. As shown in FIG. 2C, in the trimming step, UV light radiation is evenly applied to the core 5 (in such a manner that the energy of UV light applied to a unit area becomes $\Delta E$). In this case, the effective refractive index of the core 5 increases from $n_{eff}$ to $n_{eff}'$, and the Bragg wavelength $\lambda_B$ increases from $2n_{eff}\Lambda$ to $2n_{eff}'\Lambda$. As shown in FIG. 2C, in areas in which the total energy E of UV light radiation is low, UV light radiation with a radiation energy of $\Delta E$ increases the minimum value of refractive index (refractive index of the portion 8, in which the refractive index does not change, in FIG. 1) from $\Delta n_b$ to $\Delta n_b'$, and in areas in which the total energy E is high, UV light radiation with a radiation energy of $\Delta E$ increases the minimum value of refractive index (refractive index of the portion 7, in which the refractive index changes, in FIG. 1) from $\Delta n_a$ to $\Delta n_a'$. Accordingly, in the areas in which total energy E is low, UV light radiation with a radiation energy of $\Delta E$ brings about a change as great as $\Delta n_{bottom}$ ($=\Delta n_b'-\Delta n_b$) in the minimum value of troughs of photoinduced refractive index, and in the areas in which the total energy is high, UV light radiation with a radiation energy of $\Delta E$ brings about a change as small as $\Delta n_{top}$ ($=\Delta n_a'-\Delta n_a$) in the maximum value of crests of photoinduced refractive index. Consequently, UV light radiation with a radiation energy of $\Delta E$ changes the photoinduced refractive index difference $\Delta n_B=\Delta n_a-\Delta n_b$ of the Bragg grating to the photoinduced refractive index difference $\Delta n_B'=\Delta n_a'-\Delta n_b'$, as shown in FIG. 2B. As the dependence of photoinduced refractive index on UV light intensity clearly indicates, $\Delta n_{bottom}$ is always greater than $\Delta n_{top}$ ($\Delta n_{bottom}>\Delta n_{top}$), and therefore, the photoinduced refractive index difference of Bragg grating decreases (that is, $\Delta n_B>\Delta n_B'$), decreasing the reflectance of Bragg grating. With this change in photoinduced refractive index, the effective refractive index of the area in which the Bragg grating is formed changes from $n_{eff}$ to $n_{eff}'$, changing the Bragg wavelength $\lambda_B$ as well. Through the use of this phenomenon, the reflection spectrum (especially the reflectance and center wavelength of reflection) can be trimmed after the Bragg grating is formed.

Figure 3:
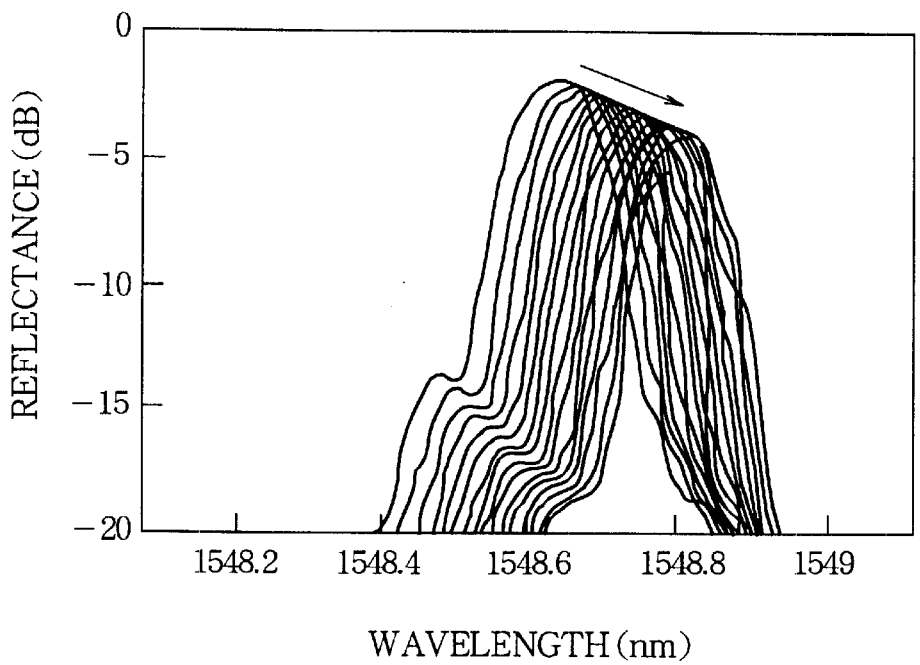
FIG. 3 shows variations in reflection spectrum while the trimming step is executed multiple times for a narrow-band FBG (Fiber Bragg Grating) in the first embodiment.
Figure 4:
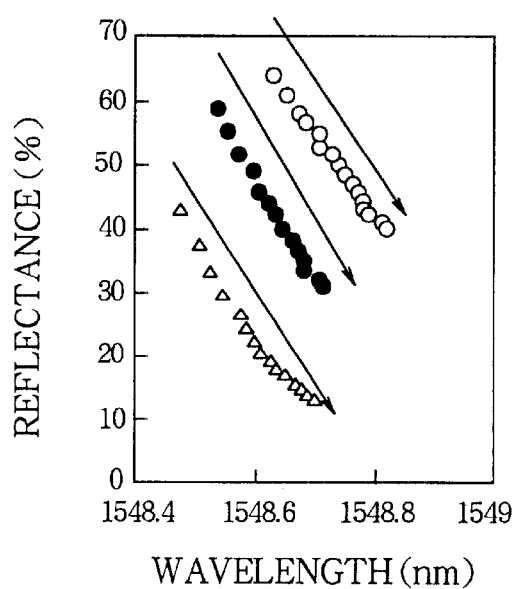
FIG. 4 shows three examples in which the trimming step of the first embodiment causes the reflectance to decrease, shifting the center wavelength of reflection to the side of a longer wavelength.

FIG. 3 shows how the reflection spectrum changes when the trimming step of the first embodiment is executed several times for a FBG with a narrow band (FWHM (Full Width at Half Maximum): about 0.2 nm). Referring to FIG. 3, as the trimming step is repeated, the reflectance decreases, shifting the center wavelength of reflection to the side of a longer wavelength and changing the reflection spectrum in a direction as indicated by arrows in the figure. FIG. 4 shows how the reflection spectrum changes while the trimming step of the first embodiment is executed for three different narrow-band FBGs (represented by the white circles, black circles, and triangles) several times each. As shown in FIG. 4, the multiple trimming steps cause the reflectances of the FBGs to decrease, shifting the center wavelength of reflection to the side of a longer wavelength. As proved by FIG. 3 and FIG. 4, the fabricating method of the first embodiment makes it possible to adjust the reflectance over the range of several tens of percentage and to adjust the reflection wavelength of about 0.2 nm corresponding to the FWHM of the Bragg grating.

The trimming of reflectance and center wavelength of reflection in a uniform Bragg grating as in the first embodiment is effective for the trimming of reflectance or wavelength of a Bragg grating used in an optical module or the like which obtains laser oscillations by an external resonator, which comprises a combination of a semiconductor optical amplifier device or the like and a Bragg grating formed in a hemispherical-ended optical fiber, or an external resonator, which comprises a combination of a semiconductor optical amplifier device or the like and a Bragg grating formed in a PLC-type (Planar Lightwave Circuit type) optical waveguide.

Figure 5:
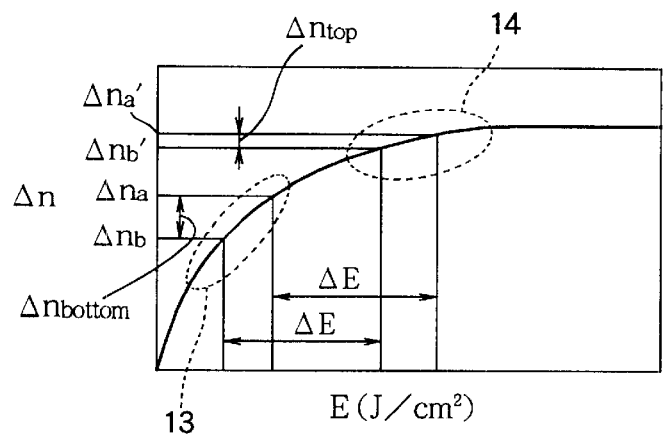
FIG. 5 illustrates a variation of the first embodiment.
Figure 6:
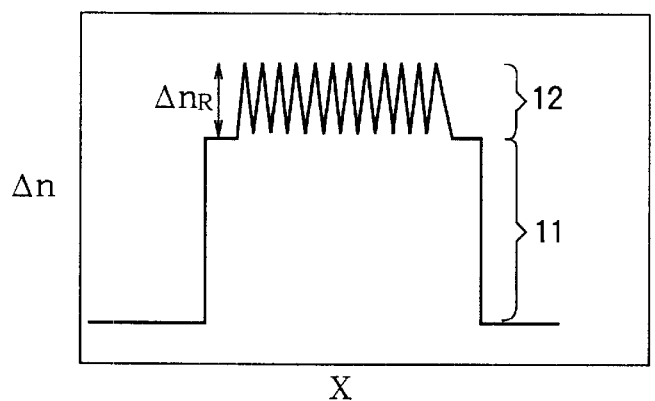
FIG. 6 shows a refractive index distribution of the core after the trimming step in the variation of the first embodiment.

FIG. 5 illustrates a variation of the first embodiment, and the curve in the figure represents photoinduced refractive index changes $\Delta n$ to the total energy E (J/cm$^2$) of UV light radiation in a unit area. This variation is different from the fabricating methods shown in FIGS. 1A–1B to FIG. 4 only in that the UV light radiation energy $\Delta E$ is greater. FIG. 6 shows a refractive index distribution of the core 5 after the trimming step. In FIG. 6, X denotes a direction of the core axis, and $\Delta n_R$ denotes a photoinduced refractive index difference. In FIG. 6, a reference numeral 11 denotes a change in a refractive index in the trimming step, and a reference numeral 12 denotes a change in a refractive index in the Bragg grating forming step. Because the portion in which photoinduced refractive index changes to fluctuations in radiation energy are small (the portion 14 in FIG. 5) is used instead of the portion in which photoinduced refractive index changes to fluctuations in radiation energy of UV light applied to a unit area are large (the portion 13 in FIG. 5), this example of variation can reduce the property degradation due to the fluctuations in radiation energy of UV light applied to a unit area applied in forming Bragg grating in a fiber.

Figure 7:
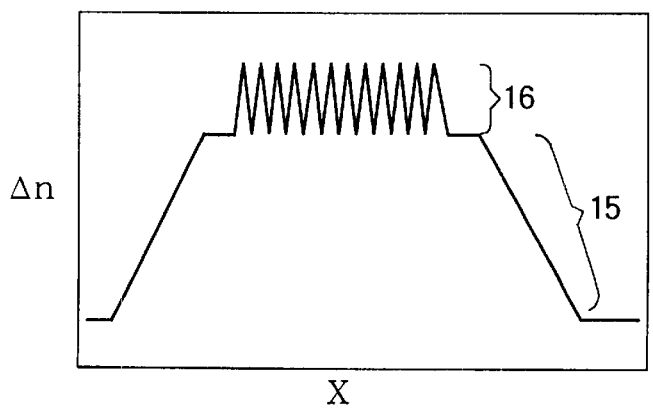
FIG. 7 shows a refractive index distribution of the core after the trimming step in another variation of the first embodiment.

FIG. 7 illustrates another variation of the first embodiment and shows the refractive index distribution of the core 5 after the trimming step. This example of variation is different from the above-mentioned fabricating method shown in FIGS. 1A–1C to FIG. 4 in that the radiation energy $\Delta E$ is greater and that the UV light radiation energy per unit area is distributed to gradually decrease in the vicinity of the longitudinal edges of the area in which Bragg grating is formed. In FIG. 7, a reference numeral 15 denotes a change in refractive index in the trimming step, and a reference numeral 16 denotes a change in refractive index by the Bragg grating forming step. With this example of variation, the property degradation due to fluctuations in the energy of UV rays applied to the fiber in forming Bragg grating (total energy of radiation per unit area of the fiber) can be reduced. In addition, the loss of light propagation on the boundary of the Bragg grating can be reduced.

Second Embodiment

A method of fabricating an optical waveguide device according to the second embodiment of the present invention relates to the step of forming Bragg grating having areas subjected to refractive index modulation (apodization) at both edges of the Bragg grating area in which a Bragg grating is formed, in order to improve the side-lobe suppression ratio.

Figure 8A:
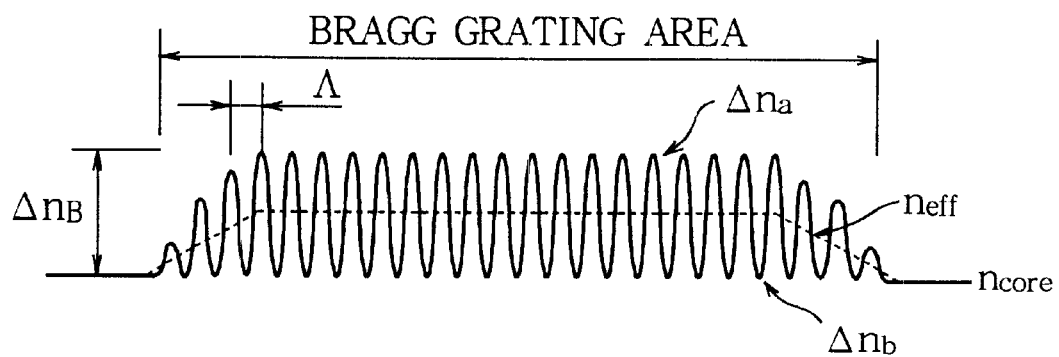
FIGS. 8A and 8B relate to a second embodiment of the present invention.
Figure 8B:
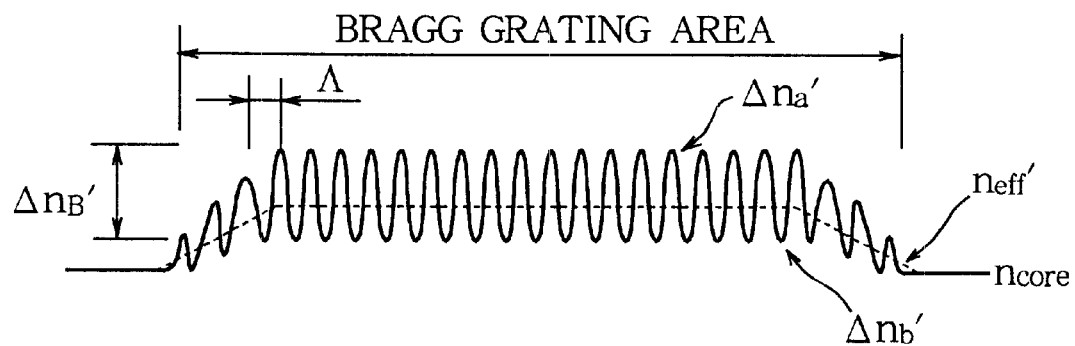

FIGS. 8A and 8B illustrate the method of fabricating an optical waveguide device of the second embodiment, FIG. 8A shows a refractive index distribution (solid line) and an effective refractive index $n_{eff}$ (broken line) of the core 5 after the Bragg grating forming step, and FIG. 8B shows a refractive index distribution (solid line) and an effective refractive index $n_{eff}'$ (broken line) of the core 5 after the trimming step.

The fabricating method of the second embodiment comprises a Bragg grating forming step, in which UV laser light is applied through a phase mask to the optical fiber to generate photoinduced refractive index changes, (step corresponding to FIG. 1A) and a trimming step, in which UV laser light is applied to the optical fiber not through a phase mask (step corresponding to FIG. 1B).

The line-and-space pitch of the phase mask in the second embodiment is fixed to $2\Lambda$. If UV laser light is applied to the optical fiber through the phase mask, portions in which the refractive index changes and portions in which the refractive index does not change are alternately formed in the core in the direction of the core axis, at a pitch of Λ, which is a half of the pitch of the phase mask. Consequently, a Bragg grating can be formed in the core. In the Bragg grating forming step in the second embodiment, apodization is performed so that the total energy of UV laser light radiation per unit area in the Bragg grating forming step gradually decreases toward the ends in the longitudinal edges of the area in which Bragg grating is formed, as shown in FIG. 8A.

In the next trimming step, apodization is performed also for UV light radiation in the trimming step in the same way as shown in FIG. 8A, so that the distribution of total energy of UV light radiation to the optical waveguide per unit area has a trapezoidal profile gradually descending in the vicinity of both longitudinal edges of the area in which Bragg grating is formed, as shown in FIG. 8B. In the trimming step, UV laser light is applied to the optical fiber not through a phase mask. When the UV laser light is applied, the table supporting the optical fiber or the UV laser light is moved in the direction of the core axis, for instance. By changing the moving speed while keeping a constant laser light radiation energy, the distribution of UV light radiation energy per unit area can be trimmed in the direction of the core axis. This allows trimming to be performed over the entire area in which Bragg grating is formed. The trimming step may be executed just once or may be executed multiple times to bring the characteristics of the optical fiber to required values. A mask may also be used to trim the distribution of UV light radiation energy in the direction of the core axis.

As has been described above, because the refractive index modulation (apodization) is performed also in the trimming step in order to solve discontinuities of refractive index at both edges of the area in which the Bragg grating is formed, the second embodiment can suppress the Fabry-Perot interference and improve the side-lobe suppression ratio of the Bragg grating.

The second embodiment is the same as the first embodiment, except for the difference described above.

Third Embodiment

In the third embodiment, UV light radiation for adjusting the reflectance (trimming) is performed over the entire area in which chirped Bragg grating with a broad band (FWHM of about 1.0 nm) are formed.

Figure 9A:
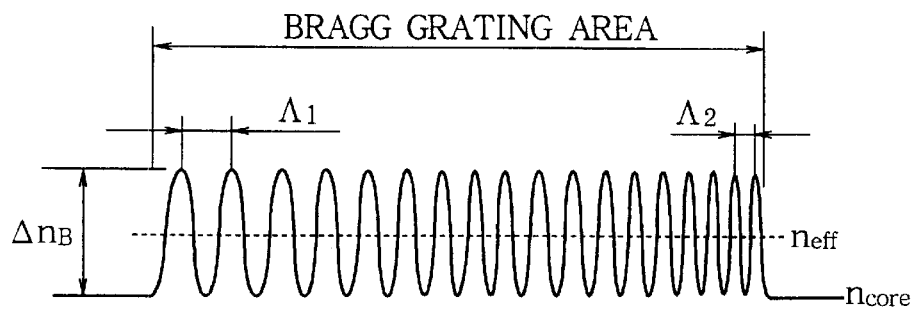
FIGS. 9A to 9C relate a the third embodiment of the present invention.
Figure 9B:
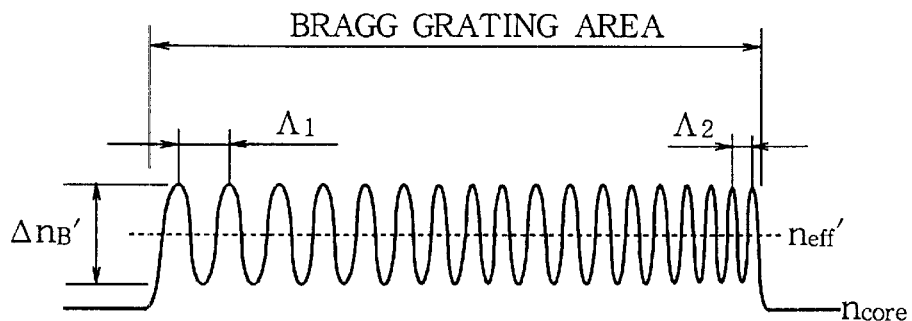
Figure 9C:
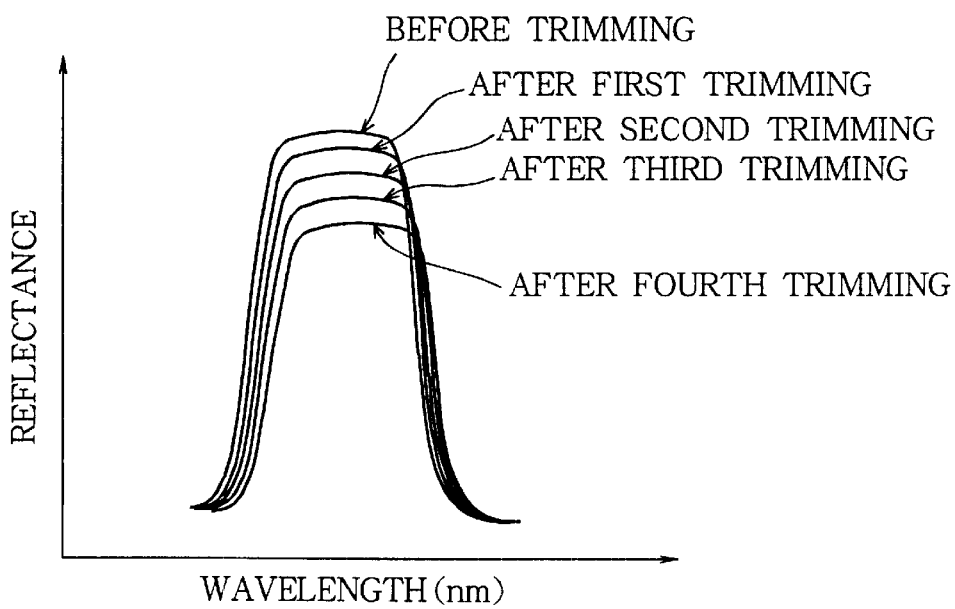

FIGS. 9A–9C illustrate a method of fabricating an optical waveguide device of the third embodiment. FIG. 9A shows a refractive index distribution (solid line) and an effective refractive index $n_{eff}$ (broken line) of the core 5 after the Bragg grating forming step. FIG. 9B shows a refractive index distribution (solid line) and an effective refractive index $n_{eff}'$ (broken line) of the core 5 after the trimming step. FIG. 9C shows a reflection spectrum varies as the trimming step is repeated.

The fabricating method of the third embodiment comprises a Bragg grating forming step, in which UV laser light is applied through a phase mask to the optical fiber to generate photoinduced refractive index changes, (step corresponding to FIG. 1A) and a trimming step, in which UV laser light is applied to the optical fiber not through a phase mask (step corresponding to FIG. 1B).

In the third embodiment, the line-and-space pitch of the phase mask is not constant but gradually increases or decreases between the maximum value $2\Lambda_1$ and the minimum value $2\Lambda_2$. If UV laser light is applied to the optical fiber through the phase mask, portions in which the refractive index changes and portions in which the refractive index does not change are alternately formed in the core in the direction of the core axis, at a pitch of $\Lambda_1$ to $\Lambda_2$, which is a half of the pitch of the phase mask. Consequently, a chirped Bragg grating can be formed in the core. As shown in FIG. 9A, the broad-band Bragg grating of the third embodiment are formed by continuously varying the pitch of the photoinduced refractive index change between the maximum value $\Lambda_1$ and the minimum value $\Lambda_2$, and the reflection wavelengths are continuous wavelengths from $\lambda_{B1}=2n_{eff}\Lambda_1$ to $\lambda_{B2}=2n_{eff}\Lambda_2$.

In the next trimming step, UV laser light is applied to the optical fiber not through a phase mask. When the UV laser light is applied, the table supporting the optical fiber or the UV laser light is moved in the direction of the core axis at a constant speed, for instance. By doing this, the whole area in which Bragg grating is formed can be trimmed. The trimming step may be executed just once or may be executed multiple times to bring the reflection characteristics of the optical fiber to required values. A mask may also be used to restrict the trimming area.

As has been described above, because UV light radiation in the trimming step is performed with an even energy over the entire area in which the chirped Bragg grating is formed, to decrease the photoinduced refractive index difference $\Delta n_B$ of the Bragg grating (to $\Delta n_B'$), the second embodiment causes the reflectance of the Bragg grating to evenly decrease in the reflection wavelength band with increase in total energy of UV light radiation. Accordingly, the reflectance can be set with a high precision, as in the first embodiment. In this example, as shown in FIG. 9C, just the reflectance can be adjusted in reality because the change in reflection wavelength is sufficiently smaller than the reflection wavelength bandwidth. If apodization is performed for the trimming to adjust the reflectance, as in the second embodiment, the side-lobe suppression ratio can be improved.

The third embodiment is the same as the first embodiment or second embodiment, except for the difference described above.

Fourth Embodiment

In the fourth embodiment, a part of the area in which the chirped Bragg grating is formed is subjected to UV light radiation for adjusting the reflectance (trimming).

Figure 10A:
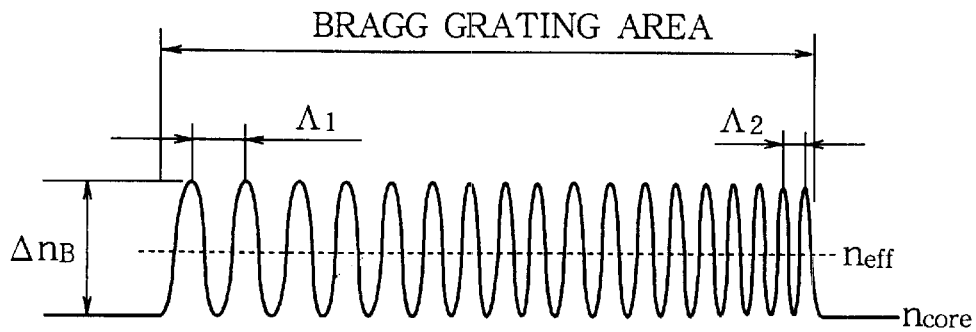
FIGS. 10A to 10C relate to a fourth embodiment of the present invention.
Figure 10B:
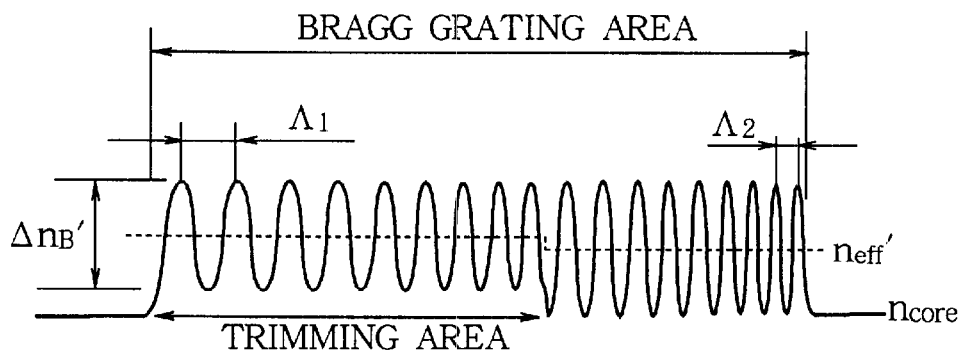
Figure 10C:
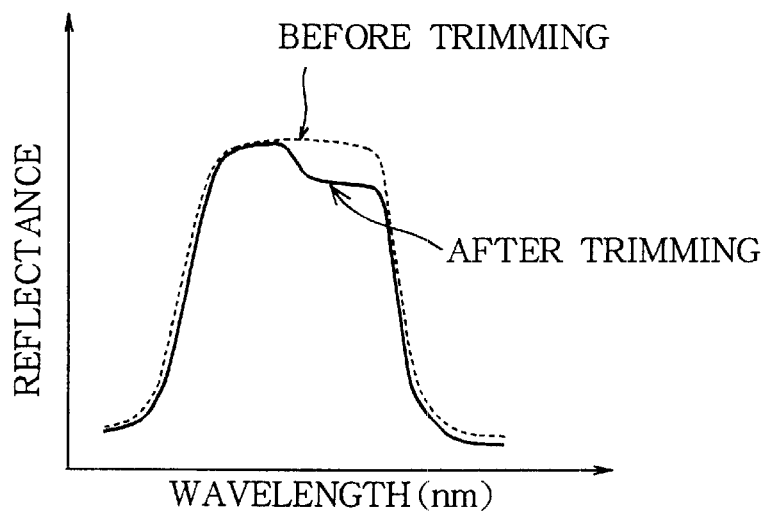

FIGS. 10A–10C illustrate a method of fabricating an optical waveguide device of the fourth embodiment. FIG. 10A shows a refractive index distribution (solid line) and an effective refractive index $n_{eff}'$ (broken line) of the core 5 after the Bragg grating forming step. FIG. 10B shows a refractive index distribution (solid line) and an effective refractive index $n_{eff}'$ (broken line) of the core 5 after the trimming step. FIG. 10C shows changes in reflection spectrum due to the trimming step.

The fabricating method of the fourth embodiment comprises the Bragg grating forming step, in which UV laser light is applied through the phase mask to the optical fiber to generate photoinduced refractive index changes, (step corresponding to FIG. 1A) and the trimming step, in which UV laser light is applied to the optical fiber not through a phase mask (step corresponding to FIG. 1B).

The line-and-space pitch of the phase mask of the fourth embodiment is not constant but gradually increases or decreases between the maximum value $2\Lambda_1$ and the minimum value $2\Lambda_2$. If UV laser light is applied to the optical fiber through the phase mask, portions in which the refractive index changes and portions in which the refractive index does not change are alternately formed in the core in the direction of the core axis, at a pitch of $\Lambda_1$ to $\Lambda_2$, which is a half of the pitch of the phase mask. Consequently, a chirped Bragg grating can be formed in the core. In other words, the broad-band Bragg grating of the fourth embodiment are formed by continuously varying the pitch of the photoinduced refractive index change between the maximum value $\Lambda_1$ and the minimum value $\Lambda_2$, as shown in FIG. 10A, and the reflection wavelengths are continuous wavelengths from $\lambda_{B1}=2n_{eff}\Lambda_1$ to $\lambda_{B2}=2n_{eff}\Lambda_2$.

In the next trimming step, UV laser light is applied to the optical fiber not through a phase mask. When the UV laser light is applied, the table supporting the optical fiber or the UV laser light is moved in the direction of the core axis, for instance. By limiting this moving range, a part of the area in which the Bragg grating is formed can be trimmed. The trimming step may be executed just once or may be executed multiple times to bring the reflection characteristics of the optical fiber to required values. The trimming area can also be limited by using a mask.

Because the UV light radiation is performed to a part of the area in which the chirped grating is formed, with a constant UV light radiation energy, the UV radiation energy distribution in the fourth embodiment shows the same profile as the broken line representing the effective refractive index $n_{eff}'$ in FIG. 10B. In other words, by executing the trimming step to a part of the area in which the chirped Bragg grating is formed, stepped reflection spectrum as represented by the solid line in FIG. 10C can be obtained.

As has been described above, the fourth embodiment provides stepped reflection spectrum in the area in which The Bragg grating is formed, as shown in FIG. 10C, and the manufactured device can be provided with such a property that the reflectance abruptly changes at a desired wavelength. This property is useful for applications to binary sensors, for instance.

It would be effective, in terms of improvement of the side lobe suppression ratio, to perform apodization for adjusting the reflectance to the profile of the UV light radiation energy distribution in the trimming step of the fourth embodiment, as in the second embodiment.

The fourth embodiment is the same as the first to third embodiments, except for the difference described above.

Fifth Embodiment

In the fifth embodiment, UV light radiation for adjusting the reflectance (trimming) is performed over the entire area in which the chirped Bragg grating is formed while continuously changing the UV light radiation energy in the direction of the core axis.

Figure 11A:
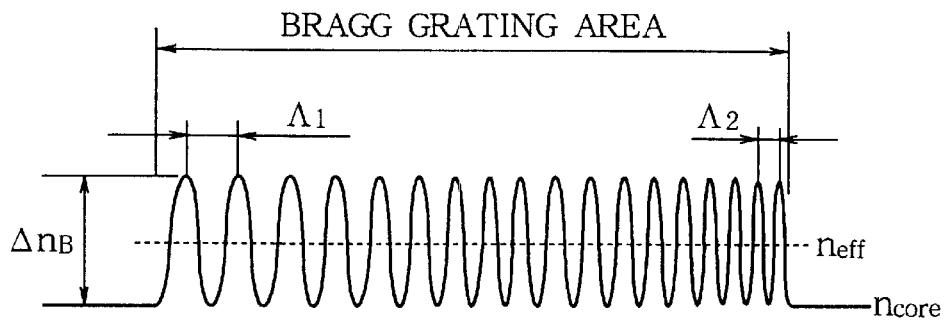
Figure 11B:
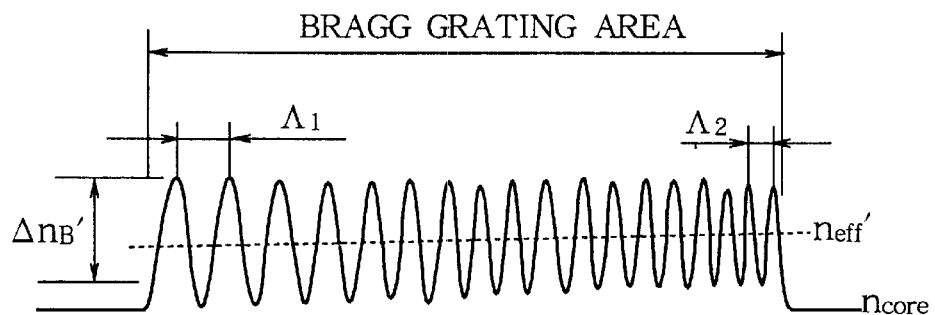
Figure 11C:
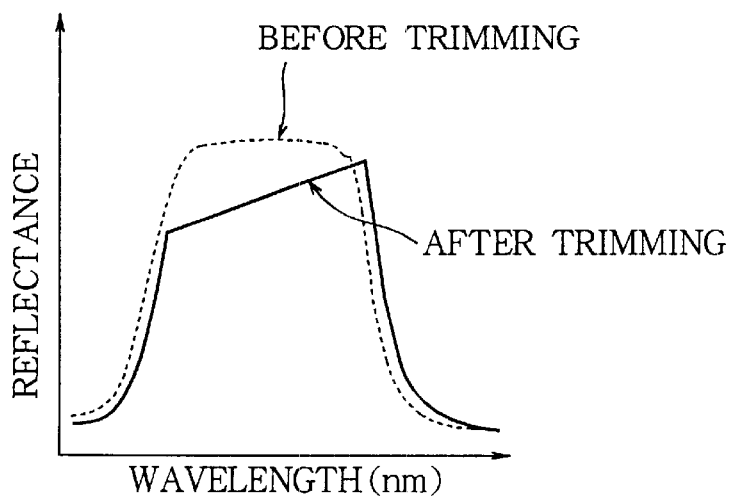

FIGS. 11A–11C illustrate a method of fabricating an optical waveguide device of the fifth embodiment. FIG. 11A shows a refractive index distribution (solid line) and an effective refractive index $n_{eff}$ (broken line) of the core 5 after the Bragg grating forming step. FIG. 11B shows a refractive index distribution (solid line) and an effective refractive index $n_{eff}'$ (broken line) of the core 5 after the trimming step. FIG. 11C shows changes in reflection spectrum due to the trimming step.

The fabricating method of the fifth embodiment comprises a Bragg grating forming step, in which UV laser light is applied through a phase mask to the optical fiber to generate photoinduced refractive index changes, (step corresponding to FIG. 1A) and a trimming step, in which UV laser light is applied to the optical fiber not through a phase mask (step corresponding to FIG. 1B).

As shown in FIG. 11A, the broad-band Bragg grating is formed by continuously changing the pitch of the gratings, for instance, from $\Lambda_1$ to $\Lambda_2$. In the meantime, the reflection wavelengths are continuous wavelengths from $\lambda_{B1}=2n_{eff}\Lambda_1$ to $\lambda_{B2}=2n_{eff}\Lambda_2$. In the fifth embodiment, UV light radiation is performed over the entire area in which the chirped grating is formed while gradually changing the UV radiation energy. The UV radiation energy distribution shows the same profile as the straight line (broken line) representing the effective refractive index $n_{eff}'$ in FIG. 11B. After the trimming step is executed, the photoinduced refractive index difference of the chirped Bragg grating decreases, as shown in FIG. 11B. The trimming step causes the reflectance of the chirped Bragg grating in the wavelength area to be inclined within the reflection wavelength band.

As has been described above, according to the fabricating method of the fifth embodiment, a continuously inclined reflection spectrum can be obtained within the area in which the Bragg grating is formed, as shown in FIG. 11C, and a property useful for applications to analog sensors and the like which utilize such a property that the reflectance increases or decreases with increase in wavelength can be provided.

It would be effective, in terms of the improvement of the side lobe suppression ratio, to perform apodization for adjusting the reflectance to the profile of the UV radiation energy distribution in the trimming step of the fifth embodiment, as in the second embodiment.

The fifth embodiment is the same as the first to fourth embodiments, except for the difference described above.

Sixth Embodiment

In the sixth embodiment, the UV light radiation for adjusting the reflectance (trimming) is performed over the entire area in which the chirped blazed Bragg grating is formed while continuously changing the UV radiation energy in given patterns in the direction of the core axis.

Figure 12A:
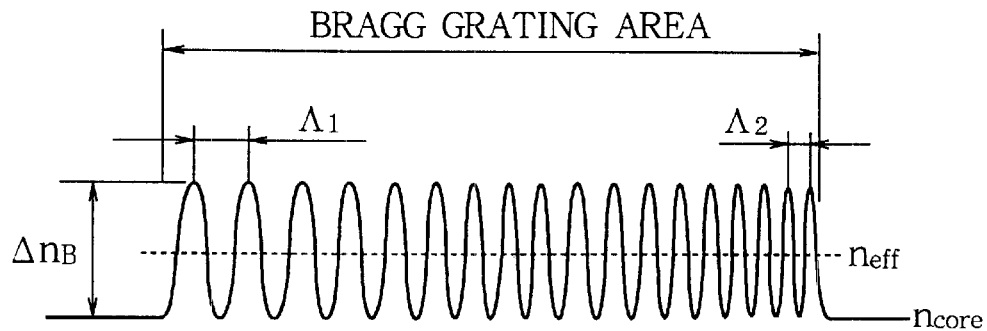
FIGS. 12A to 12C relate to a fifth embodiment of the present invention.
Figure 12B:
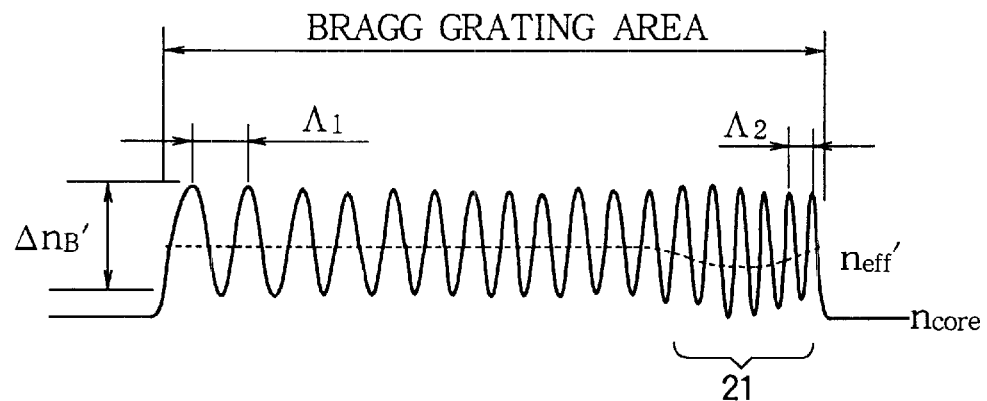
Figure 12C:
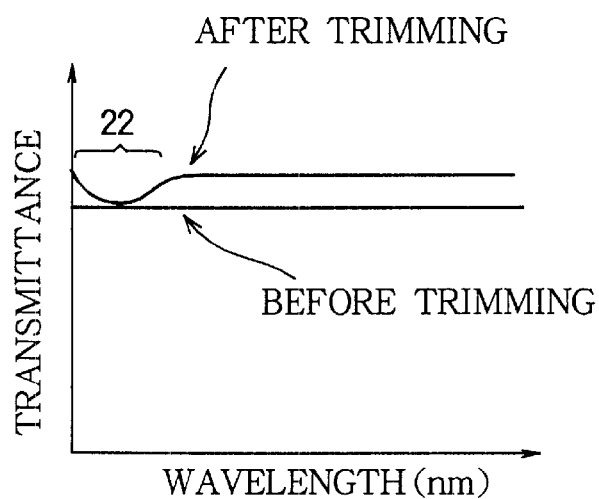
Figure 13:
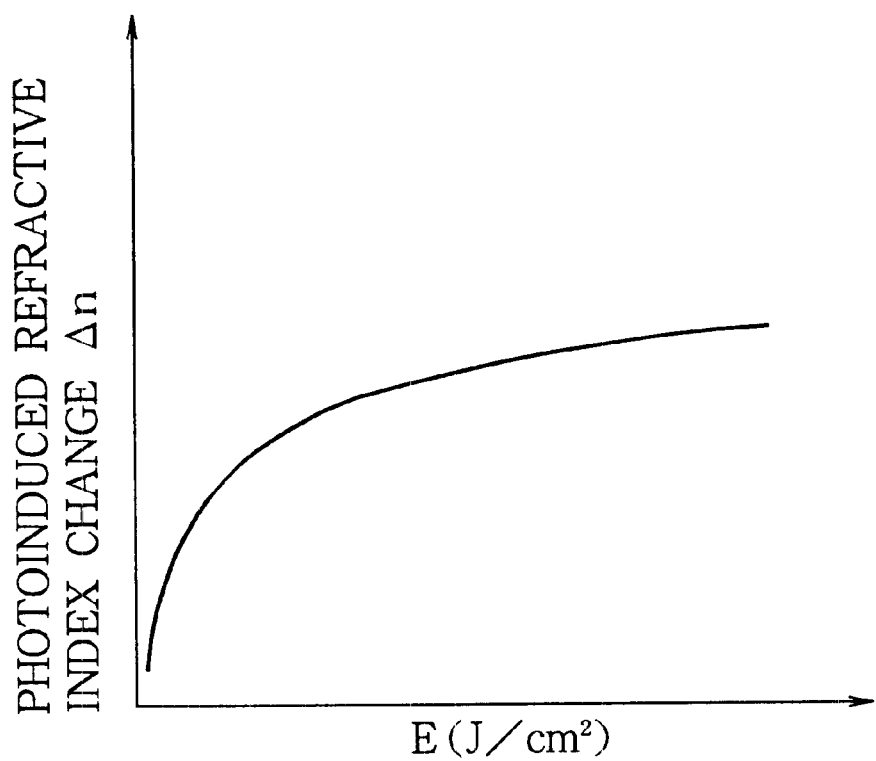
FIG. 13 shows the dependence of photoinduced refractive index change on UV light intensity.

FIGS. 12A–12C illustrate the sixth embodiment. FIG. 12A shows a refractive index distribution (solid line) and an effective reflectance (broken line) in the direction of the core axis after the Bragg grating forming step. FIG. 12B shows a refractive index distribution (solid line) and an effective reflectance (broken line) in the direction of the core axis after the trimming step. FIG. 12C shows changes in transmittance due to the trimming step.

The fabricating method of the sixth embodiment comprises a Bragg grating forming step, in which UV laser light is applied through a phase mask to the optical fiber to generate photoinduced refractive index changes, (step corresponding to FIG. 1A) and a trimming step, in which UV laser light is applied to the optical fiber not through a phase mask (step corresponding to FIG. 1B).

The line-and-space pitch of the phase mask in the sixth embodiment is not constant but gradually increases or decreases between the maximum value $2\Lambda_1$ and the minimum value $2\Lambda_2$. When UV laser light is applied through the phase mask to the optical fiber, portions in which the refractive index changes and portions in which the refractive index does not change are alternately formed in the core in the direction of the core axis, at a pitch of $\Lambda_1$ to $\Lambda_2$, which is a half of the pitch of the phase mask. Consequently, a chirped blazed Bragg grating can be formed in the core. In other words, as shown in FIG. 12A, the broad-band chirped blazed Bragg grating of the sixth embodiment are formed by continuously changing the pitch of the photoinduced refractive index change between the maximum value $\Lambda_1$ and the minimum value $\Lambda_2$, and the transmission wavelengths are continuous wavelengths from $\lambda_{B1}=2n_{eff}\Lambda_1$ to $\lambda_{B2}=2n_{eff}\Lambda_2$.

In the next trimming step, UV laser light is applied to the optical fiber not through a phase mask. When the UV laser light is applied, the table supporting the optical fiber or the UV laser light is moved in the direction of the core axis, for instance. By changing the moving speed, the distribution of the UV radiation energy per unit area can be adjusted in the direction of the core axis. The trimming step may be executed just once or may be executed multiple times to bring the reflection characteristics of the optical fiber to required values. The distribution of the UV radiation energy per unit area may also be adjusted in the direction of the core axis by using a mask.

In the sixth embodiment, UV light radiation is performed over the entire area in which the chirped blazed grating are formed while changing the distribution of UV radiation energy in certain patterns. The distribution of the UV radiation energy shows the same profile as the curved line (broken line) representing the effective refractive index $n_{eff}'$ in FIG. 12B. In FIG. 12B, the portion 21 in which the effective refractive index $n_{eff}'$ is low corresponds to the portion in which UV radiation energy is low. In addition, after the trimming step is executed, the photoinduced refractive index difference of chirped blazed Bragg grating decreases (to $\Delta n_B'$), as shown in FIG. 12B. After the trimming step, the transmittance in the wavelength area of the chirped blazed Bragg grating is subjected to a loss (a portion 22 of the transmission spectrum after the trimming of FIG. 12C) of a certain wavelength (wavelength corresponding to a portion 21 in FIG. 12B) in the transmission wavelength band.

As has been described above, the sixth embodiment provides a transmission spectrum of which loss continuously changes according to the wavelength, as shown in FIG. 12C, and these chirped blazed gratings are useful especially as gain-flattening devices of optical amplifiers.

The continuous distribution of UV radiation energy in the direction of the core axis in the trimming step of the sixth embodiment can be determined according to the use of the devices to be manufactured.

In addition, the sixth embodiment is the same as the first to fifth embodiments, except for the difference described above.

Further, the trimming method of the first to sixth embodiments can be applied to any area in which the Bragg grating is formed according to the first to sixth embodiments.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A method of fabricating an optical waveguide device comprising the steps of:
   forming a Bragg grating by applying ultraviolet light to an optical waveguide to generate photoinduced refractive index changes; and
   adjusting characteristics of the Bragg grating by applying ultraviolet light for trimming to the optical waveguide;
   wherein, in said adjusting step, a distribution of total energy of ultraviolet light applied to the optical waveguide per unit area is even over an entire longitudinal range of an area in which the Bragg grating is formed.

2. The method according to claim 1, wherein said forming step is executed to make the Bragg grating a chirped Bragg grating.

3. The method according to claim 1, wherein said forming step is executed to make the Bragg grating a blazed chirped grating.

4. The method according to claim 1, wherein, in said adjusting step, a distribution of total energy of ultraviolet light applied to the optical waveguide per unit area is even over a longitudinal range of an area in which the Bragg grating is formed, except within a desired region, in which the total energy of ultraviolet light applied per unit area is gradually varied so as to give rise to a region of reduced transmittance in the desired region.

5. The method according to claim 4, wherein said forming step is executed to make the Bragg grating a chirped Bragg grating, and wherein the region of reduced transmittance corresponds to a particular wavelength region within a transmission spectrum of the Bragg grating.

6. The method according to claim 4, wherein said forming step is executed to make the Bragg grating a blazed chirped grating, and wherein the region of reduced transmittance corresponds to a particular wavelength region within a transmission spectrum of the Bragg grating.

7. A method of fabricating an optical waveguide device comprising the steps of:
   forming a Bragg grating by applying ultraviolet light to an optical waveguide to generate photoinduced refractive index changes; and
   adjusting characteristics of the Bragg grating by applying ultraviolet light for trimming to the optical waveguide;
   wherein, in said adjusting step, a distribution of total energy of ultraviolet light applied to the optical waveguide per unit area is a trapezoidal profile gradually descending in the vicinity of both longitudinal edges of an area in which the Bragg grating is formed.

8. The method according to claim 7, wherein said forming step is executed to make the Bragg grating a chirped Bragg grating.

9. The method according to claim 7, wherein said forming step is executed to make the Bragg grating a blazed chirped grating.

10. A method of fabricating an optical waveguide device comprising the steps of:
    forming a Bragg grating by applying ultraviolet light to an optical waveguide to generate photoinduced refractive index changes; and
    adjusting characteristics of the Bragg grating by applying ultraviolet light for trimming to the optical waveguide;
    wherein, in said forming step, a distribution of total energy of ultraviolet light applied to the optical waveguide per unit area gradually descends in the vicinity of both longitudinal edges of an area in which the Bragg grating is formed; and
    wherein, in said adjusting step, a distribution of total energy of ultraviolet light applied to the optical waveguide per unit area is a trapezoidal profile gradually descending in the vicinity of both longitudinal edges of an area in which the Bragg grating is formed.

11. The method according to claim 10, wherein said forming step is executed to make the Bragg grating a chirped Bragg grating.

12. The method according to claim 10, wherein said forming step is executed to make the Bragg grating a blazed chirped grating.

13. A method of fabricating an optical waveguide device comprising the steps of:
    forming a Bragg grating by applying ultraviolet light to an optical waveguide to generate photoinduced refractive index changes; and
    adjusting characteristics of the Bragg grating by applying ultraviolet light for trimming to the optical waveguide;

wherein, in said adjusting step, a distribution of total energy of ultraviolet light applied to the optical waveguide per unit area gradually increases or decreases along a longitudinal direction of an area in which the Bragg grating is formed.

14. The method according to claim 11, wherein said forming step is executed to make the Bragg grating a chirped Bragg grating.

15. The method according to claim 13, wherein said forming step is executed to make the Bragg grating a blazed chirped grating.

16. A method of fabricating an optical waveguide device comprising the steps of:

forming a Bragg grating by applying ultraviolet light to an optical waveguide to generate photoinduced refractive index changes; and adjusting characteristics of the Bragg grating by applying ultraviolet light for trimming to the optical waveguide;

wherein, in said adjusting step, a distribution of total energy of ultraviolet light applied to the optical waveguide per unit area continuously varies along a longitudinal direction of an area in which the Bragg grating is formed.

17. The method according to claim 16, wherein said forming step is executed to make the Bragg grating a chirped Bragg grating.

18. The method according to claim 16, wherein said forming step is executed to make the Bragg grating a blazed chirped grating.

* * * * *